(12) United States Patent
Kawakami et al.

(10) Patent No.: US 8,545,115 B2
(45) Date of Patent: Oct. 1, 2013

(54) FOCAL PLANE SHUTTER FOR CAMERAS

(75) Inventors: Kenta Kawakami, Saitama (JP);
Nobuyoshi Inoue, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 20 days.

(21) Appl. No.: 13/456,360

(22) Filed: Apr. 26, 2012

(65) Prior Publication Data

US 2012/0275777 A1    Nov. 1, 2012

(30) Foreign Application Priority Data

Apr. 28, 2011    (JP) ................................. 2011-101990

(51) Int. Cl.
*G03B 9/08* (2006.01)

(52) U.S. Cl.
USPC ........... 396/471; 396/357; 396/456; 396/483; 396/484

(58) Field of Classification Search
USPC ......... 396/471, 483–488, 357, 456; 348/296, 348/367
See application file for complete search history.

(56) References Cited

U.S. PATENT DOCUMENTS

2012/0219280 A1 *    8/2012    Nishimura et al. ........... 396/456

FOREIGN PATENT DOCUMENTS

| JP | 2589062 | 1/1999 |
|---|---|---|
| JP | 2003-222928 | 8/2003 |
| JP | 2004-264468 | 9/2004 |

* cited by examiner

*Primary Examiner* — Clayton E Laballe
*Assistant Examiner* — Warren K Fenwick
(74) *Attorney, Agent, or Firm* — Wenderoth, Lind & Ponack, L.L.P.

(57) ABSTRACT

A blade room for a second blade group is formed between a shutter base plate and a middle plate and a blade room for a first blade group is formed between the middle plate and an auxiliary base plate, by separating a space between the shutter base plate and the auxiliary base plate by the middle plate. A push pin which is planted on the shutter base plate pushes a portion on the lower area of the middle plate toward the auxiliary base plate so that the middle plate bends in the shape of an arc. Also, the area of the middle plate below the exposure aperture has the narrowest width in the portion which is pushed by the push pin and the pushed portion of the middle plate has a shape by which the area of the middle plate below the exposure aperture is easy to bend.

6 Claims, 8 Drawing Sheets

FOCAL PLANE SHUTTER FOR CAMERAS

BACKGROUND OF THE INVENTION

1. Field of the Invention

This invention relates to a focal plane shutter for cameras which is provided with two shutter blade groups including a plurality of blades.

A blade room for a second blade group is formed between a shutter base plate and a middle plate and a blade room for a first blade group is formed between the middle plate and an auxiliary base plate, by separating a space between the shutter base plate and the auxiliary base plate by the middle plate. A push pin which is planted on the shutter base plate pushes a portion on the lower area of the middle plate toward the auxiliary base plate so that the middle plate bends in the shape of an arc. Also, the area of the middle plate below the exposure aperture has the narrowest width in the portion which is pushed by the push pin and the pushed portion of the middle plate has a shape by which the area of the middle plate below the exposure aperture is easy to bend. As a result, when part of a slit-forming blade of the second blade group moves to the lower side of the exposure aperture in exposure operation, the slit-forming blade does not strike against an edge of an opening portion for the optical path of light from an object on the middle plate even though the slit-forming blade bends.

2. Description of the Related Art

As known publically, focal plane shutters for cameras each of which is provided with two shutter blade groups each having a plurality of blades are formed in such a way that two blade rooms are formed by separating a shutter base plate from an auxiliary base plate by a middle plate and the two shutter blade groups are arranged in these blade rooms respectively. And, these three plates are provided with openings for guiding light from an object respectively in such a way that the openings overlap with one another. And, one or more of these openings form an exposure aperture which is shaped like a rectangle.

Also, each of the two shutter blade groups is composed of: two arms one ends of which are pivotably fitted to the shutter base plate individually on an area on one lateral side of the exposure aperture, or on an area exterior to one short side of the rectangle forming the exposure aperture; and a plurality of elongate oblong card-shaped blades which are pivotably supported by both these arms with these blades arranged toward the free ends of these arms in turn. And, when the arms are rotated in shooting, each of the blades moves while the straight end edge of each of the blades running in the direction of the width of each of the blades is being kept parallel to a long side of the exposure aperture. And, when these shutter blade groups separate from an exposure aperture, the blades of each of the shutter blade groups are folded while amounts of overlaps between the blades are becoming large. When the shutter blade groups cover the exposure aperture, the blades of each of the shutter blade groups are unfolded while amounts of overlaps between the blades are becoming small.

Also, when the two shutter blade groups perform exposure operation, one shutter blade group which is unfolded (and which is called "first blade group" hereinafter) first begins to operate and is opening the exposure aperture while amounts of overlaps between the blades of the one shutter blade group are increasing, and the other shutter blade group which is folded (and which is called "second blade group" hereinafter) subsequently begins to operate in the same direction as the first blade group does and the other shutter blade group is covering the exposure aperture while amounts of overlaps between the blades of the other shutter blade group are decreasing, so that an image plane is continuously exposed from one side to the other side by a slit that is formed between a blade running at the tail of the first blade group (and called "slit-forming blade" hereinafter) and a blade running at the head of the second blade group (and called "slit-forming blade" hereinafter). In this case, it is publicly known that a spring or a motor is used as a driving source for performing the exposure operation.

And, in the case where a spring is used as a driving source, focal plane shutters for cameras are usually formed in such a way that: a driving member which connects a driving pin to one of the arms of the first blade group (and which is called "first blade group-driving member" hereinafter) is rotated by the biasing force of a driving spring (which is called "driving spring for the first blade group" hereinafter); and a driving member which connects a driving pin to one of the arms of the second blade group (and which is called "second blade group-driving member" hereinafter) is rotated by the biasing force of a driving spring (which is called "driving spring for the second blade group" hereinafter). As known publically, focal plane shutters having such a constitution include focal plane shutters which are called "direct-type focal plane shutter" and "locking-type focal plane shutter" respectively according to a difference in constitution for keeping the first blade group-driving member and the second blade group-driving member in their states just before the start of exposure operation.

Also, it is known that, among such focal plane shutters in which exposure operation is performed with a spring as a driving source, there are focal plan shutters of both direct type and locking type in which: not only the second blade group, but also the first blade group is made to become folded before shooting so that the exposure aperture is fully opened and an object to be shot can be observed on a monitor through an imaging sensor for shooting; and when a release button is pressed in shooting, exposure operation is performed in the above-described manner after the first blade group is made to change from the state of the first blade group being folded to the state of the first blade group being unfolded in order to close the exposure aperture. And, Japanese Patent TOKUKAI No. 2003-222928 discloses a direct-type focal plane shutter having such a constitution.

On the other hand, it is known that, among focal plane shutters for which motors are used as a driving source, there are focal plane shutters in which a driving pin integrated with a rotator of a first motor is connected to one of arms of a first blade group and a driving pin integrated with a rotator of a second motor is connected to one of arms of a second blade group. Japanese Patent TOKUKAI No. 2004-264468 discloses a focal plane shutter having such a constitution as the second embodiment.

And, as in the above-described focal plane shutters in which exposure operation is performed using a spring as a driving source, the focal plane shutters having such a constitution can be also made to work in such a way that: the focal plane shutters perform cocking operation immediately after shooting; and the first blade group is worked to be folded from a state in which the first blade group is unfolded, immediately in shooting, and the second blade group is subsequently worked to be unfolded from a state in which the second blade group is folded. However, as in the focal plane shutter disclosed in Japanese Patent TOKUKAI No. 2003-222928, focal plane shutters can be also made to work in such a way that: both of the first and second blade groups are folded before shooting so that the exposure aperture is fully opened and an object to be shot can be observed on a monitor through an imaging sensor for shooting; the first blade group is unfolded to close the exposure aperture by pressing a release button in shooting; and then, the first blade group is first made to start to perform its exposure operation and the second blade group is next made to start to perform its exposure operation.

As described above, in focal plane shutters each of which is provided with two shutter blade groups, there is necessity that two shutter blade groups should be made to operate in various manners different from each other in accordance with specifications for cameras to be adopted. Accordingly, diving devices for driving the two shutter blade groups respectively are different from each other, in accordance with the specifications for the two shutter blade groups. However, the two shutter blade groups themselves have approximately the same fundamental constitution and approximately the same configuration. And, there is necessity that such two shutter blade groups should operate stably at high speed not only in exposure operation but also in another operation different from exposure operation.

However, each of the shutter blade groups is composed of two arms and a plurality of blades shaped like elongate oblong card and pivotably supported by the arms, as described above. In addition, each of the blades is made of a thin material in order to make the blades have light weight. As a result, when a shutter blade group is worked to change from the folded state of the shutter blade group to the unfolded state of the shutter blade group and is covering the exposure aperture, there is no means supporting the middle portion of each of the shutter blade groups in their longitudinal directions, so that each of the blades inevitably bends while the blades are running. As a result, the middle portion of each of the shutter blade groups may inevitably bend in the direction perpendicular to the surface of each of the blades. And, when the exposure aperture is closed, a bend that is formed on the approximately middle portion of the slit-forming blade moving at the head of the blades in its longitudinal direction inevitably strikes against an edge of the opening for the optical path of light from an object, the opening being provided with the middle plate. As a result, a situation where operation of the shutter blade group is disturbed (the occurrence of bounces of or tilts of the shutter blade group) or a situation where the blades are damaged inevitably occurs.

In order to prevent the occurrence of such situations, Japanese Utility Model registration No. 2589062 discloses countermeasures in which both edges of the opening formed on the middle plate and for guiding light from an object, which correspond to the two long sides of the exposure aperture, are formed to be approximately shaped like the letter "V", or in addition to this matter, a groove having a predetermined length and running from the apex of the V-shaped edge in a direction of the blades of one shutter blade group moving is provided for the edge toward which the one shutter blade group moves while its blades are being unfolded in exposure operation.

However, further improvements in a plurality of blades for moving a shutter blade group at a high speed have made the method as disclosed in Japanese Utility Model registration No. 2589062 insufficient for some focal plane shutters for cameras, in recent years, Japanese Utility Model registration No. 2589062 disclosing the formation of the V-shaped edges of the opening for guiding light from an object on the middle plate and the formation of a groove in the apex of the V-shaped edge. Accordingly, it has been also considered to form a focal plane shutter in such a way that the middle plate made in the shape of a plane plate is not fitted to the shutter base plate with the middle plate having a plane plate-like shape unlike conventional manners but is fitted to the shutter base plate while an area toward which the shutter blade groups move with a plurality of their blades unfolded in exposure operation originally is becoming an arc-shaped surface swelling slightly in a direction in which the blades swell.

SUMMARY OF THE INVENTION

The present invention relates to an improvement in such focal plane shutters for cameras each including two shutter blade groups and having various constitutions, the improvement in focal plane shutters preventing the operation of a shutter blade group from being disturbed due to an impact of a slit-forming blade running at the head of a plurality of blades against an edge of an opening formed on the middle plate to guide light from an object toward which the shutter blade group moves, in a process of making a shutter blade group work to change from the folded state of the shutter blade group to the unfolded state of the shutter blade group, and the improvement in focal plane shutters preventing shutter blade groups from being damaged.

As described above, many improvements on the shapes of middle plates and on constitutions for fitting middle plates have been made over and over again in various kinds of focal plane shutters each of which is provided with two shutter blade group, up to now. However, particularly, focal plane shutters for high-grade cameras that professional photographer and camera enthusiasts cherish have required shutter blade groups capable of operating at high speed more stably than ever, in recent years. Accordingly, the focal plane shutters are under the necessity that the focal plane shutters should be formed in such a way that: a face of the slit-forming edge of a slit-forming blade running at the head of blades in a process of making a shutter blade group work to change from the folded state of the shutter blade group to the unfolded state of the shutter blade group does not at all touch any portion of the face of the edge of an opening toward which the shutter blade group moves, the opening being used for guiding light from an object and being formed on the middle plate; and the operation of the shutter blade group is hardly disturbed even though the face of the slit-forming edge of the slit-forming blade slightly touches the face of the edge of the opening toward which the shutter blade group moves.

In order to meet such a need, it is preferred that the focal plane shutters are formed in such a way that an area of the middle plate toward which a slit-forming blade moves deforms flexibly in accordance with the state of blades swelling. Accordingly, a way of making a middle plate thinner than ever is considered as one way to achieve such a middle plate. However, middle plates have been made to have as considerably thin thicknesses as possible, up to now. Accordingly, if a middle plate is made to have a thickness thinner than ever, it inevitably becomes impossible to control irregular force which is known to occur just after the start of the operation of a shutter blade group and which acts in a direction different from the direction in which the shutter blade group works, so that there occurs a problem that each of the blades of the shutter blade group inevitably jolts large in all operation processes of the shutter blade group, rather.

The present invention is made in order to solve such a problem. The objective of the present invention is to offer focal plane shutters for cameras: in which one shutter blade group is arranged in each of two blade rooms, the two blade rooms being formed by separating a space between a shutter base plate and an auxiliary base plate by a middle plate; in which a slit-forming blade can operate more stably than ever even though the front edge of the slit-forming blade locally touches the edge of an opening for guiding light from an object which is formed on the middle plate in a process of making a shutter blade group work to change from the folded state of the shutter blade group to the unfolded state of the shutter baled group; and which are particularly effective in applying the focal plane shutters to high-grade cameras.

In order to achieve the above described objective, a focal plane shutter for cameras according to the present invention, in which two blade rooms are formed by separating a space between a shutter base plate and an auxiliary base plate by a middle plate, an exposure aperture is formed by at least one of opening portions for exposure that are provided on these three plates respectively, first and second blade groups arranged in the blade rooms respectively include a plurality of elongate blades, and, in exposure operation, the first blade group changes from the unfolded state of the blades of the first blade group to the folded state of the blades of the first blade group to open the exposure aperture and the second blade group changes from the folded state of the blades of the second blade group to the unfolded state of the blades of the second blade group to close the exposure aperture, is formed in such a way that: a second plate of the three plates is provided with a push pin which is erectly placed on the middle area of the second plate between an exposure aperture-forming side toward which the shutter blade groups move in exposure operation and an outer contour-forming edge in the second plate, the second blade group being arranged in the space between the second plate and the middle plate; the middle plate is pushed by the push pin to bend toward a third plate of the three plates; and the middle plate is formed in such a way that an area of the middle plate external to the exposure aperture-forming side of the second plate has the narrowest width in the portion which is pushed by the push pin and, as two width-defining edges defining the width of the area of the middle plate external to the exposure aperture-forming side of the second plate extend from the narrowest portion to the both ends of the exposure aperture-forming side of the second plate more and more, the width-defining edge on the exposure-aperture side gradually comes near to the both ends of the exposure aperture-forming side of the second plate and the other width-defining edge gradually comes near to the outer contour-forming edge of the second plate.

In this case, it is preferred yet more that the narrowest width in the area of the middle plate external to the exposure aperture-forming side of the second plate is approximately as large as the maximum dimension of the cross section of the push pin in a direction perpendicular to the exposure aperture-forming side or that the narrowest portion in the area of the middle plate external to the exposure aperture-forming side of the second plate is divided by a slit which is formed to run in the direction perpendicular to the exposure aperture-forming side of the second plate and portions of the middle plate which form the both sides of the slit respectively are pushed by the push pin.

Also, a focal plane shutter for cameras according to the present invention may be formed in such a way that: an edge of the opening portion of the middle plate toward which the shutter blade groups move in exposure operation is formed to be approximately shaped like the letter "V", the opening portion of the middle plate being used for the optical path of light from an object; an outer contour-forming edge of the middle plate toward which the shutter blade groups move in exposure operation is formed to be approximately parallel to the exposure aperture-forming side of the second plate; and, in addition, the area of the middle plate external to the exposure aperture-forming side of the second plate is divided by a slit which is formed from the apex of the V-shaped edge in a direction perpendicular to the exposure aperture-forming side of the second plate, and portions of the middle plate which form the both sides of the slit respectively are pushed by the push pin.

In addition, a focal plane shutter for cameras according to the present invention may be formed in such a way that: the third plate of the three plates is provided with a second push pin which is erectly placed on the middle area of the third plate between an exposure aperture-forming side opposite to the exposure aperture-forming side of the second plate and an outer contour-forming edge in the third plate and which runs toward the middle plate, the first blade group being arranged in the space between the third plate and the middle plate; an area of the middle plate external to the second exposure aperture-forming side of the third plate is divided by a slit which is formed in a direction perpendicular to the second exposure aperture-forming side of the third plate; and portions of the middle plate which form the both sides of the slit are pushed by the second push pin to bend toward the second base plate.

A focal plane shutter for cameras according to the present invention, in which two blade rooms are formed by separating a space between a shutter base plate and an auxiliary base plate by a middle plate and two shutter blade groups are arranged in the two blade rooms one by one respectively, is formed in such a way that an area of the middle plate toward which the shutter blade groups move in exposure operation can bend more preferably than ever in accordance with irregular force caused by operation of the shutter blade groups. As a result, the present invention makes it possible to finish operation of the shutter blade groups yet more stably without causing disturbance of operation of the shutter blade groups as compared with conventional focal plane shutters even though the slit-forming blade of the second blade group bends and part of the slit-forming blade touches the edge of the opening for exposure that is formed on the middle plate when the part of the slit-forming blade of the second blade group moves to the area of the middle plate while the second blade group is changing from the folded state of the second blade group to the unfolded state of the second blade group.

This and other objects as well as the features and the advantages of the present invention will become apparent from the following detailed description of the preferred embodiments when taken in conjunction with the accompanying drawings.

DETAILED DESCRIPTION OF THE PREFERRED EMBODIMENTS

Figure 4:
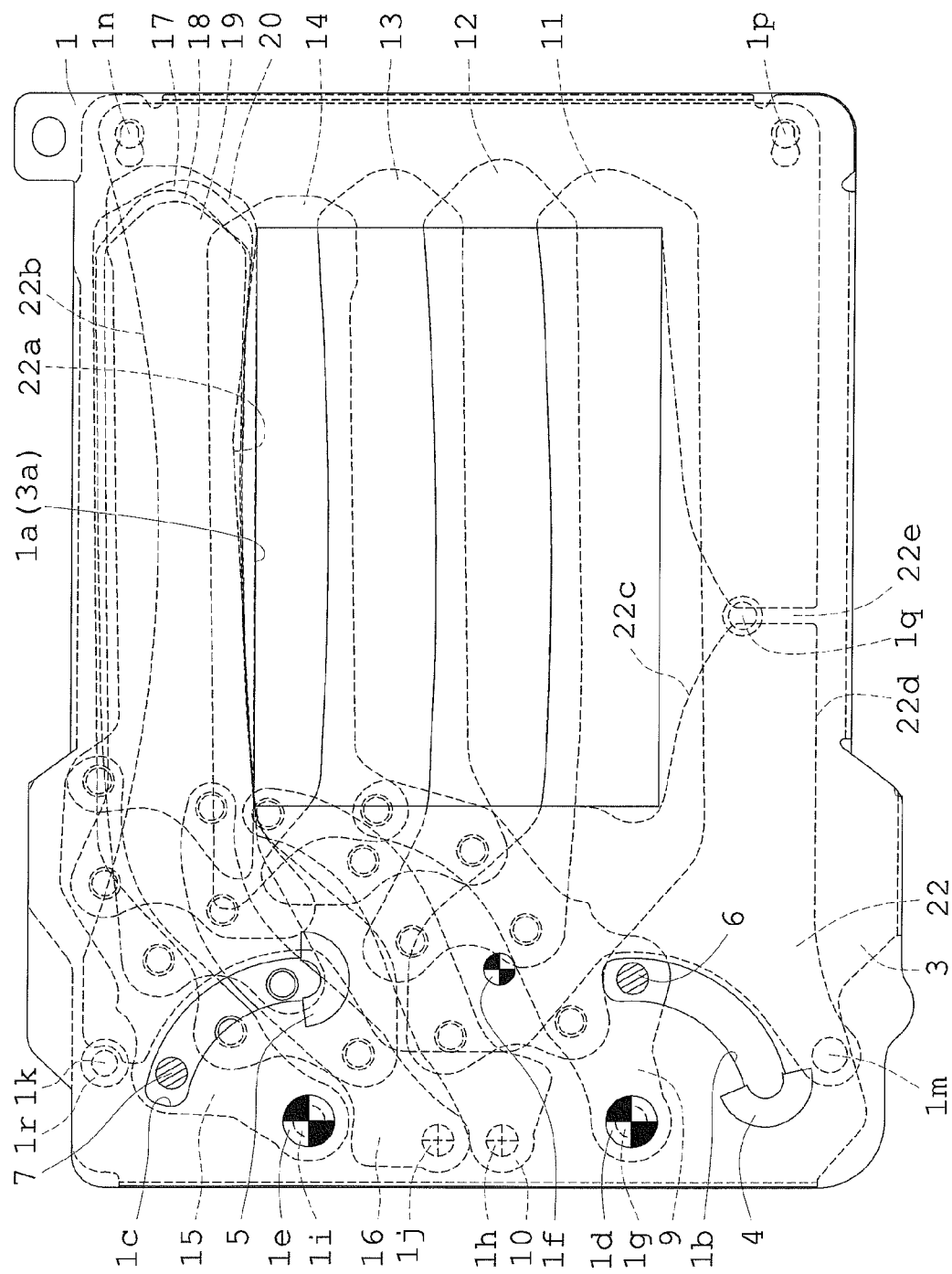
FIG. 4 is a plane view showing a focal plane shutter of the embodiment 2 according to the present invention when the focal plane shutter of the embodiment 2 is viewed from the object side and showing the state of the focal plane shutter of the embodiment 2 just before the start of exposure operation.
Figure 5:
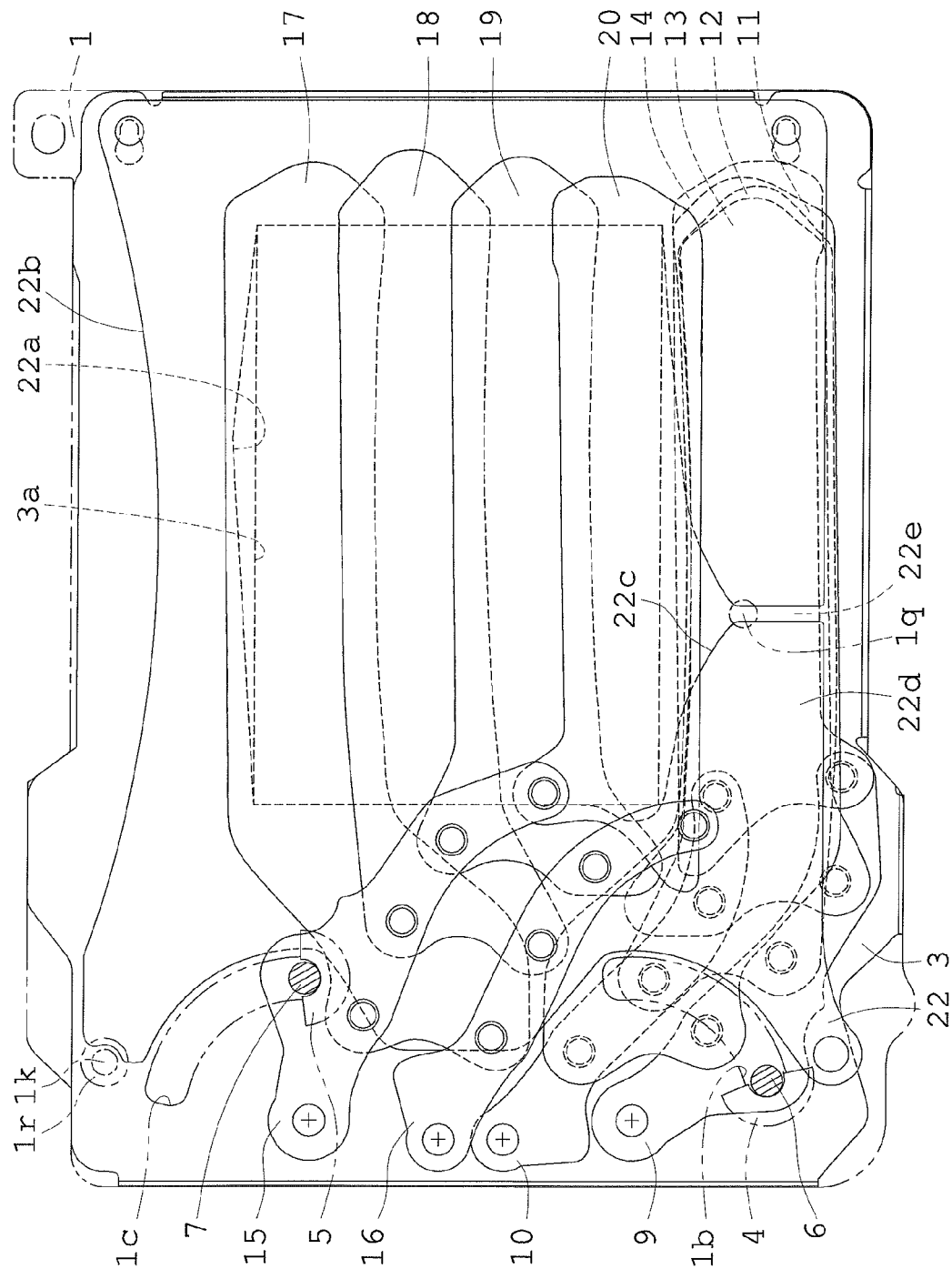
FIG. 5 is a plane view showing the focal plane shutter of the embodiment 2 when the focal plane shutter shown in FIG. 4 is viewed with its shutter base plate removed from the focal plane shutter, and showing a state in which exposure operation of a second blade group of the focal plane shutter of the embodiment 2 is complete.
Figure 6:
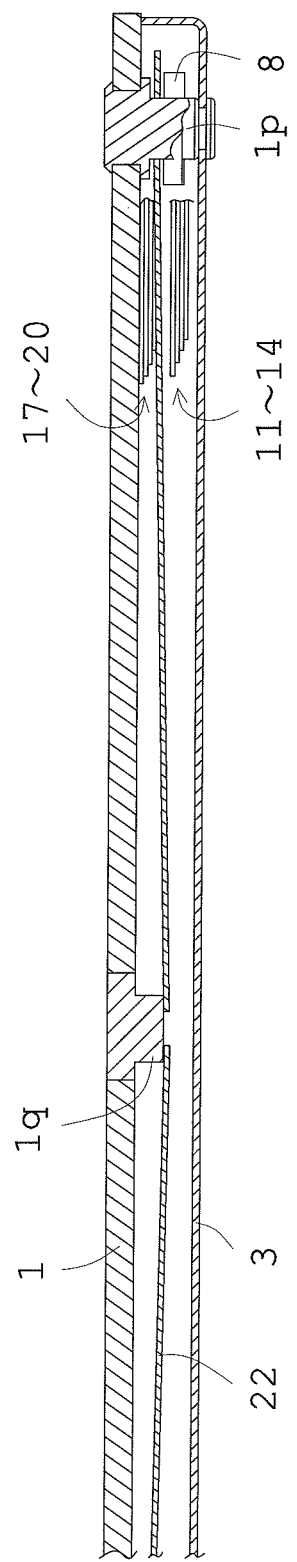
FIG. 6 is a cross sectional view showing main parts of the focal plane shutter shown in FIG. 4.
Figure 7:
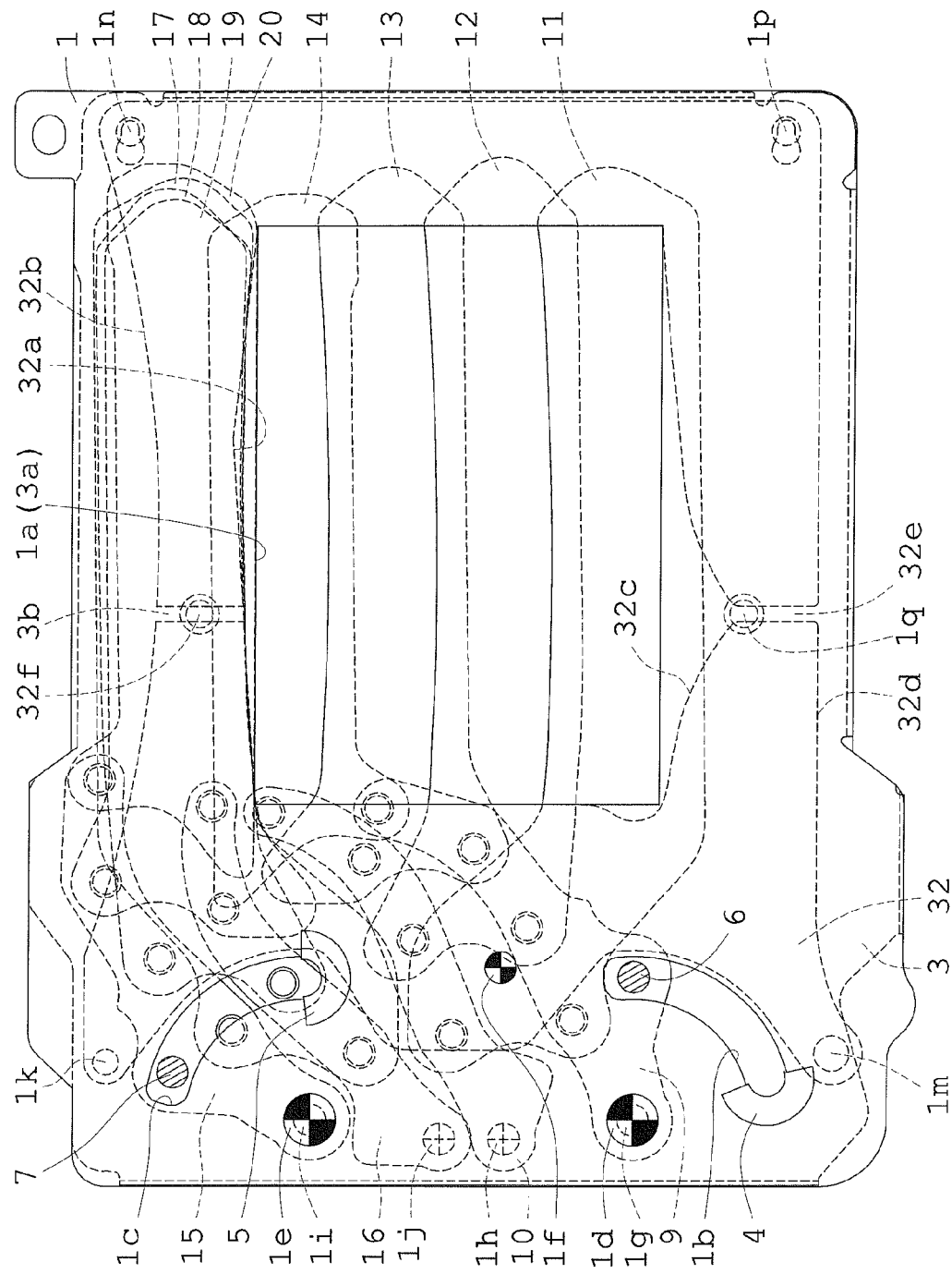
FIG. 7 is a plane view showing a focal plane shutter of the embodiment 3 according to the present invention when the focal plane shutter of the embodiment 3 is viewed from the object side and showing the state of the focal plane shutter of the embodiment 3 just before the start of exposure operation.
Figure 8:
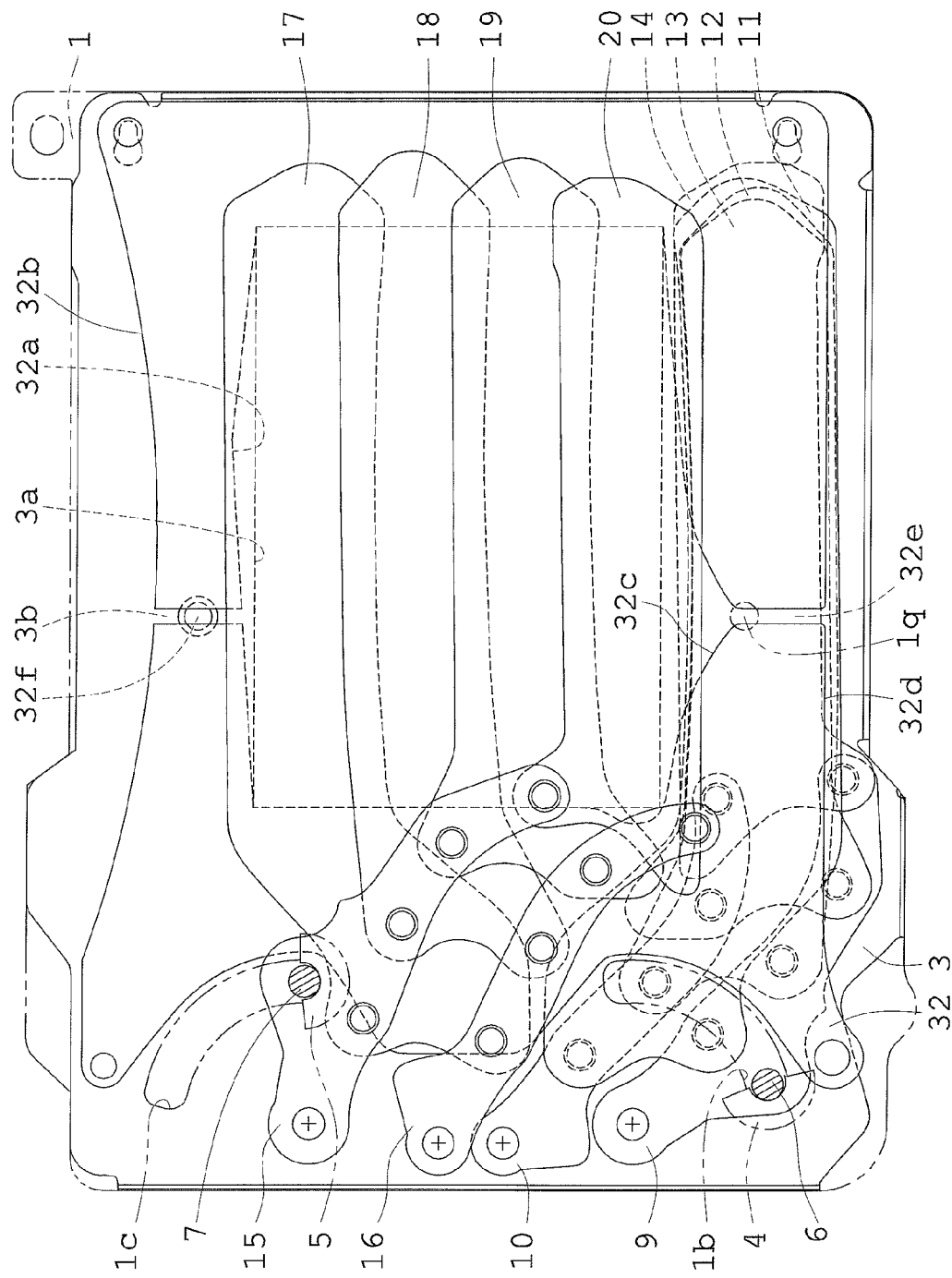
FIG. 8 is a plane view showing the focal plane shutter of the embodiment 3 when the focal plane shutter shown in FIG. 7 is viewed with its shutter base plate removed from the focal plane shutter, and showing a state in which exposure operation of a second blade group of the focal plane shutter of the embodiment 3 is complete.

The present invention is explained with three embodiments. As described above, the present invention is applicable to various kinds of focal plane shutters which are different from one another in device for driving them. However, every one of these embodiments is explained in the cases of focal plane shutters having conventionally well-known orthodox operation in which: the two shutter blade groups perform exposure operation by using springs as a driving source; and the two shutter blade groups are made to perform cocking operation immediately after the completion of the exposure operation. Besides, FIGS. 1 to 3 are used for explaining the embodiment 1 of the present invention, FIGS. 4 to 6 are used for explaining the embodiment 2 of the present invention, and FIGS. 7 and 8 are used for explaining the embodiment 3 of the present invention.

Embodiment 1

Figure 1:
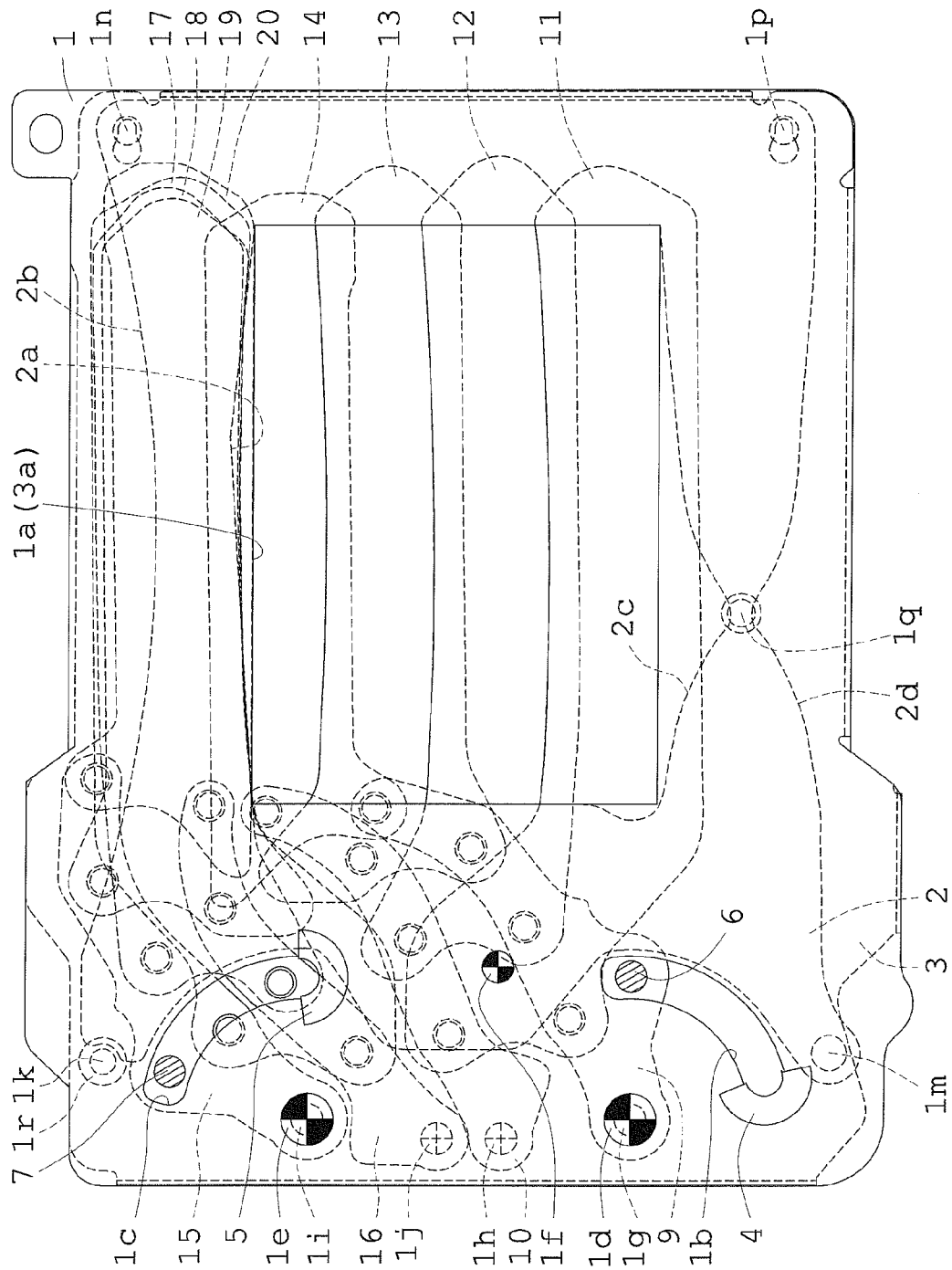
FIG. 1 is a plane view showing a focal plane shutter of the embodiment 1 according to the present invention when the focal plane shutter of the embodiment 1 is viewed from the object side and showing the state of the focal plane shutter of the embodiment 1 just before the start of exposure operation.
Figure 2:
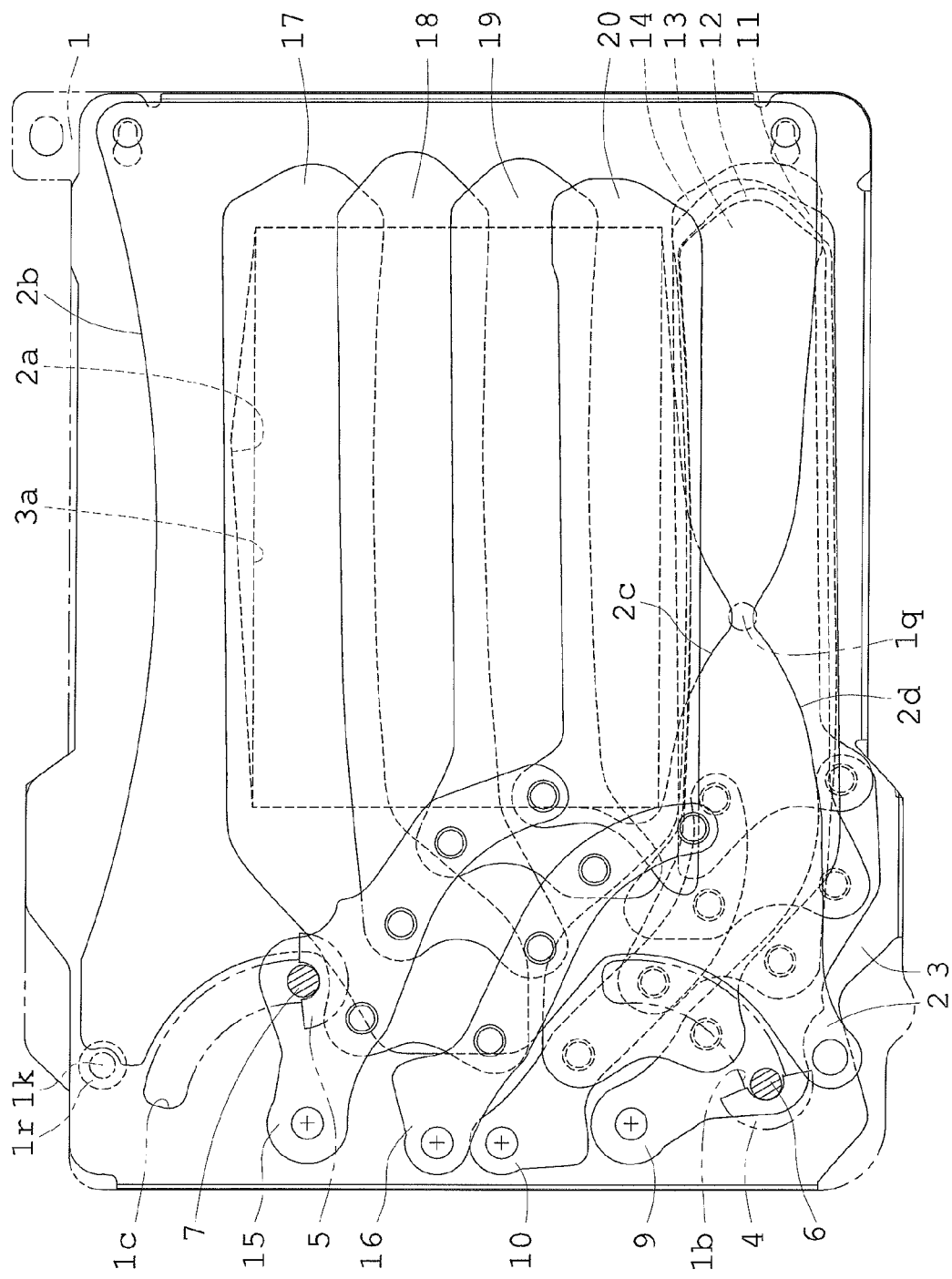
FIG. 2 is a plane view showing the focal plane shutter of the embodiment 1 when the focal plane shutter shown in FIG. 1 is viewed with its shutter base plate removed from the focal plane shutter, and showing a state in which exposure operation of a second blade group of the focal plane shutter of the embodiment 1 is complete.
Figure 3:
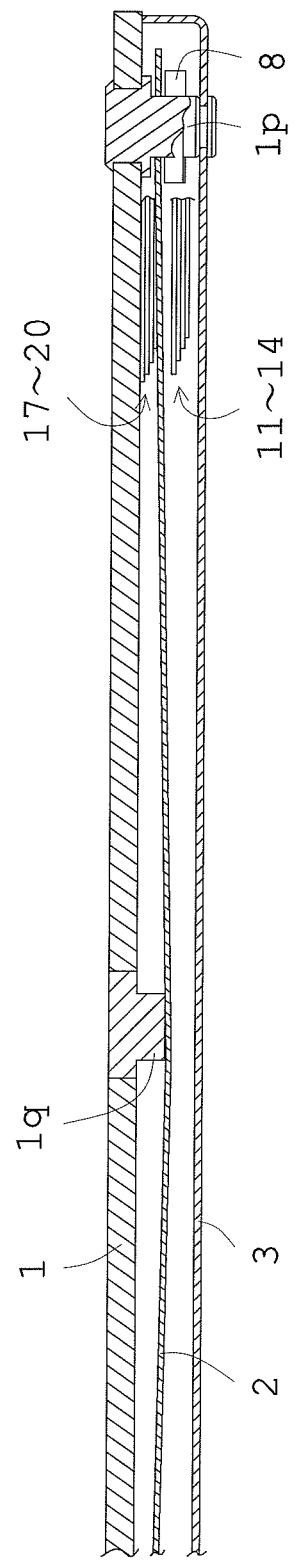
FIG. 3 is a cross sectional view showing main parts of the focal plane shutter shown in FIG. 1.

The embodiment 1 of the present invention is explained using FIGS. 1 to 3. Besides, FIG. 1 is a plane view showing a focal plane shutter of the present embodiment when the focal plane shutter is built into a camera and is viewed from the object side, and FIG. 1 shows the state of the focal plane shutter of the present embodiment just before the start of exposure operation. Because a driving device used for the present embodiment is publicly well known, the concrete constitution of the driving device is omitted in FIG. 1. Also, FIG. 2 is a plane view showing the focal plane shutter of the present embodiment when the focal plane shutter is viewed with the shutter base plate shown in FIG. 1 removed from the focal plane shutter, and FIG. 2 shows a state in which exposure operation of a second blade group of the focal plane shutter is complete. In FIG. 2, only essential parts of the shutter base plate shown in FIG. 1 and two buffer members fitted to the shutter base plate are shown by long dashed double-short dashed line. In addition, FIG. 3 shows a partial cross section of the focal plane shutter of the present embodiment, taken along a segment connecting the centers of parts 1p and 1q in FIG. 1.

In FIG. 1, a rectangle-shaped opening portion 1a for the optical path of light from an object is provided on the approximately middle portion of a shutter base plate 1. Also, as known publically, a middle plate 2 and an auxiliary base plate 3 are fitted to the back side of the shutter base plate 1 in turn at predetermined intervals. And, in the present embodiment, a space between the shutter base plate 1 and the middle plate 2 is used as a blade room for a second blade group, and a space between the middle plate 2 and the auxiliary base plate 3 is used as a blade room for a first blade group. However, focal plane shutters according to the present invention are not limited to such an arrangement of the blade groups into the blade rooms, the space between the shutter base plate 1 and middle plate 2 may be used as the blade room for the first blade group, and the space between the middle plate 2 and the auxiliary base plate 3 may be used as the blade room for the second blade group. A focal plane shutter having such a constitution will be explained below.

The middle plate 2 and the auxiliary base plate 3 which are plate members like the shutter base plate 1 are also provided with opening portions 2a and 3a for the optical path of light from an object, the opening portions 2a and 3a being different from the opening portion 1a in shape or size. In these opening portions, the opening portion 2a of the middle plate 2 is larger than the opening portion 1a of the shutter base plate 1. A peculiar shape of the opening portion 2a, together with the shape of the whole of the middle plate 2, will be described below. Also, the opening portion 3a of the auxiliary base plate 3 is shaped like a rectangle like the opening portion 1a of the shutter base plate 1, as seen in FIG. 2. However, in fact, the opening portion 3a is somewhat larger than the opening portion 1a. Accordingly, in the present embodiment, an exposure aperture as a shutter unit through which light from an object passes is determined by the opening portion 1a. However, as known publically, the exposure aperture may be composed of two or more opening portions of these three opening portions. Accordingly, the present invention does not ban such a constitution.

Besides, when the focal plane shutter of the present embodiment is built into a camera in the explanation about the present embodiment, it is presumed that the focal plane shutter of the present embodiment is arranged while the shutter base plate 1 is facing the object side. However, as known publically, when the focal plane shutter of the present embodiment is built into a digital camera, the focal plane shutter of the present embodiment may be arranged while the auxiliary base plate 3 is facing the object side. Also, as known publically, the thickness of the middle plate 2 is considerably thinner than that of the shutter base plate 1. In contrast, the auxiliary base plate 3 may be made to have a considerably thick thickness, and the present invention also does not ban such a considerably thick auxiliary base plate. However, in the present embodiment, the auxiliary base plate 3 is thin and has approximately the same thickness as the middle plate 2 does, as shown in FIG. 3.

In such three plates, two arc-shaped elongate holes 1b and 1c are formed on a portion of the shutter base plate 1 on the left side of the opening portion 1a. And, publically-known buffer members 4 and 5 the plane shapes of which are approximately shaped like the letter "C" and which are made of rubber are fitted to the lower ends of the holes 1b and 1c, respectively. Also, the area of the middle plate 2 on the left side of the exposure aperture is smaller than that of the shutter base plate 1 and does not overlap with the area on which the elongate holes 1b and 1c are formed. However, the auxiliary base plate 3 as a whole is approximately as large as the shutter base plate 1. Accordingly, elongate holes which are not shown in the drawings are formed on the auxiliary base plate 3 with the elongate holes overlapping with the elongate holes 1b and 1c respectively and having approximately the same shapes as the elongate holes 1b and 1c respectively, due to publically-known and below-described reasons.

In FIG. 1, shafts 1d, 1e, and 1f are erectly provided on the front side of the shutter base plate 1. Also, shafts 1g, 1h, 1i, 1j, 1k, 1m, 1n, and 1p are erectly provided on the back side of the shutter base plate 1. In addition, a push pin 1q is provided on the back side of the focal plane shutter 1. The shafts 1g and 1i are erectly placed while the shafts 1g and 1i are being concentric with the shafts 1d and 1e that are erectly provided on the front side of the shutter base plate 1 respectively. Also, an annular reception part 1r having a predetermined thickness is formed in the base of the shaft 1k, and the left-upper side portion of the middle plate 2 can come into contact with the reception part 1r from the auxiliary-base-plate-3 side. Besides, although the shafts 1d, 1e, 1f, 1g, 1h, 1i, 1j, 1m, 1n, and 1p are not shown in FIG. 2, the shaft 1k, the push pin 1q, and the reception part 1r are shown by long dashed double-short dashed line in FIG. 2, like the contour shape of the focal plane shutter 1, the elongate holes 1b and 1c, and the buffer members 4 and 5.

A first blade group-driving member and a second blade group-driving member which are not shown in the drawings are rotatably fitted to the shafts 1d and 1e that are erectly provided on the front side of the shutter base plate 1, respectively. And, the first blade group-driving member and the second blade group-driving member are biased by a driving spring for the first blade group and a driving spring for the second blade group respectively so that the first blade group-driving member and the second blade group-driving member are rotated in the clockwise direction, the driving springs being not shown in the drawings. Also, a cocking member which rotates in a reciprocating manner in response to the operation of a camera body-side member and which is not shown in the drawings is rotatably fitted to the shaft 1f that is erectly provided on the front side of the shutter base plate 1. Besides, the constitutions of these members are omitted in the drawings because the constitutions of these members are well-known publically. For, example, a typical example of the constitutions of these members is disclosed in Japanese Patent TOKUKAI No. 2008-46533.

Each of the first blade group-driving member and the second blade group-driving member includes a driving pin on the shuter-base-plate-1 side. The driving pins go through the elongate arc-shaped holes 1b and 1c of the shutter base plate 1 respectively, and the top ends of the driving pins are inserted into the elongate arc-shaped holes that are formed on the auxiliary base plate 3 and that are not shown in the drawings, respectively. Such a driving pin 6 of the first blade group-driving member and such a driving pin 7 of the second blade group-driving member are shown in FIGS. 1 and 2 with only the driving pins 6 and 7 hatched. Besides, FIG. 1 shows a state in which these blade group-driving members have been rotated in the counterclockwise direction against the biasing forces of the driving springs, respectively. And, as known publically, clockwise rotations of these blade group-driving members are prevented by respective locking members not shown in the drawings in locking-type focal plane shutters or by the cocking member in direct-type focal plane shutters.

The middle plate 2 and the auxiliary base plate 3 are fitted to the shafts 1k, 1m, 1n, and 1p that are erectly provided on the back side of the shutter base plate 1 at predetermined intervals. And, as to methods of fitting these plates to the shutter base plate 1, as known publically in the middle plate 2, the shafts 1m, 1n, and 1p are merely fitted into holes which are formed in three corners of the middle plate 2 except the left-upper corner of the middle plate 2, in such a way that the middle plate 2 can move in the axial direction of the shafts 1m, 1n, and 1p running.

Also, the auxiliary base plate 3 is also fitted to the shafts 1k, 1m, 1n, and 1p in a publically-known manner. That is to say, a ring-shaped groove is formed throughout the circumference of a shaft surface in the vicinity of the top end of each of the shafts 1n and 1p. And, oblong holes which are shaped like a keyhole consisting of large and small holes that are linked with each other are provided for portions of the auxiliary base plate 3 which correspond to the grooves of the shafts 1n and 1p respectively. In addition, screw holes are formed on the top faces of the shafts 1k and 1m, respectively. And, holes are formed on the portions of the auxiliary base plate 3 which correspond to the shafts 1k and 1m respectively, respectively. The auxiliary base plate 3 is fitted in such a way that: after the shafts 1n and 1p are first fitted into the large holes of the keyhole-shaped holes respectively, the auxiliary base plate 3 is moved to the left; and the edges of the small holes of the keyhole-shaped holes are next fitted to the ring-shaped grooves of the shafts 1n and 1p respectively. Afterward, the auxiliary base plate 3 is fixed to the top faces of the shafts 1k and 1m through screws. And, spacers 8 as shown in FIG. 3 are fitted to the shafts 1m and 1p between the middle plate 2 and the auxiliary base plate 3, respectively.

The shape of the middle plate 2 fitted to the shutter base plate 1 in such a manner and the state of the middle plate 2 fitted to the shutter base plate 1 are next explained. The contour of the portion of the middle plate 2 on the left side of the opening portion 2a is made to have a complex shape in order that the portion of the middle plate 2 on the left side of the opening portion 2a does not overlap with the elongate holes 1b and 1c of the shutter base plate 1 as described above. Also, the edge of the opening portion 2a which corresponds to the left short side of the exposure aperture is shaped like a straight line on the whole, while only part of the lower portion of the edge of the opening portion 2a corresponding to the left short side of the exposure aperture is formed in the shape of a curved line that swells to the left. In addition, both of the contour shape of the area of the middle plate 2 on the right side of the opening portion 2a and the edge of the opening portion 2a which corresponds to the right short side of the exposure aperture are shaped like a straight line. And, these shapes in the middle plate 2 are well-known publically.

In contrast, the area of the middle plate 2 above the opening portion 1a of the shutter base plate 1 or above the exposure aperture and the area of the middle plate 2 below the exposure aperture have peculiar shapes in the present embodiment. Now, the shape of the area of the middle plate 2 above the exposure aperture, or the shape of the area of the middle plate 2 in which a below-described second blade group is folded to be stored in the present embodiment, is first explained. In the middle plate 2 for the present embodiment, the edge of the opening portion 2a which corresponds to the upper long side of the exposure aperture is shaped like the letter "V", as disclosed in Japanese Utility Model registration No. 2589062. Also, the contour shape-forming edge 2b of the middle plate 2 is not formed to be approximately parallel to the long sides of the exposure aperture unlike conventional manners but is formed to have an arc shape which is convex toward the exposure aperture, the area of the middle plate 2 above the exposure aperture being formed between the contour shape-forming edge 2b and the edge of the opening portion 2a.

Next, the shape of the area of the middle plate 2 which is exterior to the exposure aperture-forming side and to which a slit-forming blade of the below-described second blade group moves at the last stage of exposure operation, or the shape of the area of the middle plate 2 which is exterior to the lower long side of the exposure aperture in the present embodiment, is explained. An edge 2c of the middle plate 2 which corresponds to the lower long side of the exposure aperture is formed by a curved line in such a way that the edge 2c has a shape of the letter "V" larger than the corresponding edge in Japanese Utility Model registration No. 2589062 does. Also, a contour shape-forming edge 2d of the middle plate 2 is not formed to be approximately parallel to a long side of the exposure aperture unlike conventional manners but is formed in such a way that the shape of the area of the middle plate 2 below the exposure aperture which is formed between the edge 2c and the contour shape-forming edge 2d is symmetrical. As a result, the vertical width of the area of the middle plate 2 formed by the edges 2c and 2d is narrowest at a portion between the apices of the V-shapes of the edges 2c and 2d, and the push pin 1q which is provided for the shutter base plate 1 comes into contact with the portion having the narrowest width in the area formed between the edges 2c and 2d.

That is to say, the two edges 2c and 2d are formed by a curved line in such a way that, as the two edges 2c and 2d defining the vertical width of the area of the middle plate 2 below the exposure aperture extend from the narrowest portion to the left and right sides of the long side of the exposure aperture more and more, the one edge 2c gradually comes near to the both ends of the long side of the exposure aperture and the other edge 2d gradually comes near to the lower-side outer contour-forming edges of the shutter base plate 1 and the auxiliary base plate 3. And, as shown in FIG. 3, the middle plate 2 for the present embodiment is fitted to the shutter base plate 1 while the push pin 1q is pushing the narrowest portion of the area of the middle plate 2 so that the middle plate 2 is bent toward the auxiliary base plate 3.

Besides, in the present embodiment, the top face of the push pin 1q is formed to be flat. However, the present invention is not limited to such a shape of the push pin 1q, and the top face of the push pin 1q may be formed to be spherical. Also, although the push pin 1q for the present embodiment is shaped like a cylinder, the push pin 1q may be shaped like a quadratic prism for example, and the top face of the push pin 1q may be shaped like an arc in this case. In addition, the width dimension of the narrowest portion of the lower area of the middle plate 2 is approximately the same as the dimension of the push pin 1q in the direction perpendicular to the long side of the exposure aperture (the diameter of the push pin 1q), in the present embodiment. However, the width dimension of the narrowest portion of the lower area of the middle plate 2 may be larger than that in the present embodiment as long as the narrowest portion of the middle plate 2 can be easily bent by the push pin 1q.

Next, the constitutions of the first and second blade groups are explained. The first blade group which is arranged between the middle plate 2 and the auxiliary base plate 3 is composed of: two arms 9 and 10 one ends of which are pivotably fitted to the two shafts 1g and 1h respectively, the two shafts 1g and 1h being erectly provided on the back of the shutter base plate 1; and four blades 11, 12, 13, and 14 which are pivotably supported by the arms 9 and 10 toward the free ends of the arms in turn. And, the blade 14 which is pivotably supported by the arms nearest to the free ends of the arms becomes a slit-forming blade. And, the driving pin 6 of the first blade group-driving member is fitted into a publically-known hole provided for the arm 9. Also, the relation between the arms 9 and 10 and the blades 11, 12, 13, and 14 on the overlap arrangement of these arms and these blades is such that the arms 9 and 10 are located nearest to the shutter auxiliary base plate 3 and the blade 11 is located nearest to the middle plate 2.

Also, the second blade group which is arranged between the shutter base plate 1 and the middle plate 2 is composed of: two arms 15 and 16 one ends of which are pivotably fitted to the two shafts 1i and 1j respectively, the two shafts 1i and 1j being erectly provided on the back of the shutter base plate 1; and four blades 17, 18, 19, and 20 which are pivotably supported by the arms 15 and 16 toward the free ends of the arms 15 and 16 in turn. And, the blade 20 which is pivotably supported by the arms 15 and 16 nearest to the free ends of the arms 15 and 16 becomes a slit-forming blade. And, the driving pin 7 of the second blade group-driving member is fitted into a publically-known hole provided for the arm 15. Also, the relation between the arms 15 and 16 and the blades 17, 18, 19, and 20 on the overlap arrangement of these arms and these blades is such that the arms 15 and 16 are located nearest to the shutter base plate 1 and the blade 17 is located nearest to the middle plate 2.

Next, the operation of the focal plane shutter of the present embodiment is explained. FIG. 1 shows the state of the focal plane shutter of the present embodiment just before the start of exposure operation. Accordingly, the four blades 11 to 14 of the first blade group are unfolded and cover the exposure aperture, or the opening portion 1a in the present embodiment, and the four blades 17 to 20 of the second blade group are folded and stored in the area above the opening portion 1a. When a release button of a camera is pressed in such a state of the focal plane shutter, the publically-known first blade group-driving and second blade group-driving members which are rotatably fitted to the shafts 1d and 1e respectively and which are not shown in the drawings stand capable of rotating at a predetermined timing in turn.

First, when the first blade group-driving member is made to stand capable of rotating, the first blade group-driving member is rotated in the clockwise direction by the biasing force of the publically-known driving spring for the first blade group, the driving spring being not shown in the drawings. As a result, the driving pin 6 rotates the arm 9 in the clockwise direction, so that the four blades 11 to 14 of the first blade group move toward the lower side of the opening portion 1a while the amounts of overlaps between adjacent blades of the four blades 11 to 14 are increasing, and the opening portion 1a is being opened more and more through the upper edge of the slit-forming blade 14. And, in the case where an object to be shot is dark and shooting with flash is performed, the second blade group-driving member is rotated in the clockwise direction after the opening portion 1a is fully opened by the four blades 11 to 14 of the first blade group, as known publically. However, the operation of the focal plane shutter of the present embodiment is explained in the case where an object to be shot is blight and shooting without flash is performed.

As described above, when predetermined time passes after the first blade group-driving member starts to rotate in the clockwise direction, the second blade group-driving member becomes capable of rotating, and the second blade group-driving member is rotated in the clockwise direction by the biasing force of the publically-known driving spring for the second blade group, the driving spring being not shown in the drawings. As a result, the driving pin 7 rotates the arm 15 in the clockwise direction, so that the four blades 17 to 20 of the second blade group move toward the opening portion 1a while the amounts of overlaps between adjacent blades of the four blades 17 to 20 are decreasing, and the opening portion 1a is being closed from the upper side of the opening portion 1a more and more through the lower edge of the slit-forming blade 20. As a result, from then, the image plane of an imaging sensor is exposed from the upper side of the image plane to the lower side of the image plane by a slit which is formed between the slit-forming blade 14 of the first blade group and the slit-forming blade 20 of the second blade group.

Now, the contour shape of the middle plate 2 above the exposure aperture in the present embodiment is different from those in prior art. That is to say, as explained already, the middle plate 2 for the present embodiment is formed in such a way that the contour shape-forming edge 2b of the area of the middle plate 2 in which the four blades 17 to 20 of the second blade group are folded and stored is shaped like an arc and becomes convex toward the exposure aperture, or toward the opening portion 1a. As a result, in the state of the focal plane shutter which is shown in FIG. 1, the width of the overlap between the four blades 17 to 20 of the second blade group and the middle plate 2 is smallest in the approximately middle portion of the blades 17 to 20 in their longitudinal direction. The reason why the middle plate 2 for the present embodiment has such a shape is explained here.

As in the present embodiment, when the second blade group is arranged between the shutter base plate 1 and the middle plate 2 and the first blade group is arranged between the middle plate 2 and the auxiliary base plate 3, the space between the shutter base plate 1 and the middle plate 2 needs the largest distance in a place in which the four blades 17 to 20 of the second blade group are folded, and the space between the middle plate 2 and the auxiliary base plate 3 needs the largest distance in a place in which the four blades 11 to 14 of the first blade group is folded, as known publically. That is to say, in the present embodiment, the blade room between the shutter base plate 1 and the middle plate 2 needs the largest distance in a place above the opening portion 1a, and the blade room between the middle plate 2 and the auxiliary base plate 3 needs the largest distance in a place below the opening portion 1a.

However, there is necessity to reduce the distance between the shutter base plate 1 and the auxiliary base plate 3 as much as possible due to downsizing of cameras in recent years. Accordingly, when the four blades 11 to 14 of the first blade group are folded, the middle plate 2 and the auxiliary base plate 3 pinch the four blades 11 to 14 relatively hard. And, when the four blades 17 to 20 of the second blade group are folded, the shutter base plate 1 and the middle plate 2 pinch the four blades 17 to 20 relatively hard. As a result, both of the four blades 11 to 14 of the first blade group and the four blades 17 to 20 of the second blade group have to be made to start to move against resistant friction force larger than that in prior art when the blade groups work to change from the folded states of the blade groups to the unfolded states of the blade groups respectively.

Under such a circumstance, it is when cocking operation is performed that the four blades 11 to 14 of the first blade group in the present embodiment are made to work to change from the folded state of the four blades 11 to 14 to the unfolded state of the four blades 11 to 14. Accordingly, shooting itself has no particularly large problem even though timing with which the first blade group is made to start to operate and a position of the slit-forming blade of the first blade group at the start of the operation of the first blade group become somewhat unstable.

However, it is when exposure operation is performed that the four blades 17 to 20 of the second blade group work to change from the folded state of the four blades 17 to 20 to the unfolded state of the four blades 17 to 20. Accordingly, when resistant friction force between the blades 17 to 20, resistant friction force between the slit-forming blade 20 and the shutter base plate 1, and resistant friction force between the blade 17 and the middle plate 2 are large, timing with which the second blade group starts to operate inevitably become unstable and the second blade group inevitably starts to operate with the slit-forming blade 20 somewhat inclining, due to slight differences caused in process of making parts or in assembly process. As a result, particularly in the case where shooting is performed at high speed, exposure time cannot be obtained stably or exposure unevenness occurs, which becomes a highly large problem. Accordingly, the contour shape-forming edge 2b of the middle plate 2 is formed in the shape of an arc in the present embodiment, in order to effectively reduce a contact area between the blade 17 of the folded second blade group and the middle plate 2 from the standpoint of the whole constitution.

That is to say, the reason why the contour shape-forming edge 2b of the middle plate 2 is formed in the shape of an arc while the both ends of the upper area of the second plate 2 are being located as in prior art for the convenience in fitting the middle plate 2 to the shutter base plate 1 and in order to prevent the fitting parts of the middle plate 2 from interfering with the operation of the blades is that the present invention gives consideration to the focal plane shutter of the present embodiment in order that the slit-forming blade 20 is indirectly made to start to operate smoothly and stably by reducing a contact area between the blade 17 and the middle plate 2 to reduce the resistant friction forces and it becomes hard for the slit-forming blade 20 to incline to right and left at the start of the movement of the second blade group. Besides, although the contour shape-forming edge 2b is formed in the shape of an arc in the present embodiment, any shape of the contour shape-forming edge 2b which is convex toward the exposure aperture on the whole can bring effects equal to those in the contour shape-forming edge 2b shaped like an arc even though the contour shape-forming edge 2b is not formed in the shape of an arc.

Now, the explanation of the present embodiment returns to the subject of the exposure operation of the first and second blade groups. The first blade group and the second blade group for the present embodiment form a slit having a predetermined distance and the image plane of the imaging sensor is exposed through the slit, as described above. Amounts of the overlaps between adjacent blades of the four blades 11 to 14 of the first blade group increase as the image plane of the imaging sensor is exposed through the slit, so that the four blades 11 to 14 gradually become incapable of easily bending and then are stored in the area below the opening portion 1a. And, the driving pin 6 of the first blade group-driving member meets the buffer member 4 to be stopped just after the upper edge of the slit-forming blade 14 moves away from the opening portion 1a.

On the other hand, the four blades 17 to 20 of the second blade group moves to the opening portion 1a while amounts of the overlaps between adjacent blades of the four blades 17 to 20 are decreasing, as described above, so that the four blades 17 to 20 gradually become capable of easily bending. In addition, as a result of the arrangement of the four blades 17 to 20 and the arms 15 and 16, the four blades 17 to 20 are made to bend in such a way that the approximately middle portions of the four blades 17 to 20 in their longitudinal direction swell toward the middle plate 2 in this case. As a result, the face of the slit-forming edge of the slit-forming blade 20 may inevitably strike against the face of the edge of the middle plate 2 to which part of the slit-forming edge of the slit-forming blade 20 moves at the last stage of exposure operation if the edge of the middle plate 2 to which the part of the slit-forming edge of the slit-forming blade 20 moves at the last stage of the exposure operation is formed parallel to the long side of the exposure aperture.

However, the middle plate 2 for the present embodiment is provided for the focal plane shutter while the area of the middle plate 2 below the exposure aperture is being formed in the above-described shape and the push pin 1q is pushing the flexible portion having the narrowest width in the area of the middle plate 2 toward the auxiliary base plate 3 in advance so that the area of the middle plate 2 below the exposure aperture becomes an arc-like surface. As a result, the slit-forming blade 20 does not strike against the face of the edge 2c of the opening portion 2a even though the slit-forming blade 20 swells in the above-described manner. Also, even if the slit-forming blade 20 strikes against the face of the edge 2c of the opening portion 2a, that collision between the slit-forming blade 20 and the face of the edge 2c does not affect the exposure operation at all. In addition, no situation where the slit-forming blade 20 is inevitably broken by that collision between the slid-forming blade 20 and the face of the edge 2c of the opening portion 2a occurs at all. And, the exposure operation of the second blade group is stopped by contact between the driving pin 7 of the second blade group-driving member and the buffer member 5 just after that. That state of the focal plane shutter of the present embodiment is shown in FIG. 2.

Afterward, when imaging information is sent from the imaging sensor through an image-processing circuit and is written in a storage means in the state of the focal plane shutter which is shown in FIG. 2, cocking operation is started immediately. Because such cocking operation is performed in a publically-known manner, the cocking operation is explained briefly. As described above, a publically-known cocking member which is not shown in the drawings is rotatably fitted to the shaft 1f of the shutter base plate 1 shown in FIG. 1. When shooting finishes in the above-described manner, the cocking member is rotated from its initial position in the clockwise direction by a camera body-side member which is not shown in the drawings. As a result, the first blade group-driving member is first made to start to rotate in the counterclockwise direction against the biasing force of the driving spring for the first blade group, and the second blade group-driving member is subsequently made to start to rotate in the counterclockwise direction against the biasing force of the driving spring for the second blade group.

When the first blade group-driving member first starts to rotate in the counterclockwise direction, the driving pin 6 rotates the arm 9 in the counterclockwise direction in FIG. 2, so that the four blades 11 to 14 of the first blade group that are stored in the area below the opening portion 1a move upward while amounts of overlaps between adjacent blades of the four blades 11 to 14 are decreasing and the slit-forming blade 14 is heading the four blades 11 to 14. And, when overlap between the slit-forming blade 14 of the first blade group and the slit-forming blade 20 of the second blade group reaches a predetermined amount, the cocking member which is not shown in the drawings makes the second blade group-driving member start to rotate in the counterclockwise direction against the biasing force of the driving spring for the second blade group. As a result, the driving pin 7 rotates the arm 15 in the counterclockwise direction, so that the four blades 17 to 20 of the second blade group which cover the opening portion 1a move upward while the amounts of overlaps between adjacent blades of the four blades 17 to 20 are increasing.

As a result, the first blade group and the second blade group continue to move afterward, with the amount of the overlap between the slit-forming blades favorably kept. When the cocking operation reaches the stage where: the four blades 11 to 14 of the first blade group are unfolded to cover the opening portion 1a; and the four blades 17 to 20 of the second blade group are folded to be stored in the area above the opening portion 1a, the rotation of the cocking member is stopped. Afterward, the first blade group-driving member and the second blade group-driving member are locked by locking members respectively as a result of a return of the cocking member to its initial position in locking-type focal plane shutters, or the cocking member keeps iron piece members of the first blade group-driving member and the second blade group-driving member coming into contact with electromagnets respectively in direct-type focal plane shutters. FIG. 1 substantially shows that state of the focal plane shutter.

Besides, the focal plane shutter of the present embodiment is explained as a focal plane shutter in which the publically-known first blade group-driving and second blade group-driving members not shown in the drawings are rotated by the springs as a driving source respectively in exposure operation. However, the present invention is not limited to such a focal plane shutter, and the present invention is applicable both to a focal plane shutter as disclosed in Japanese Patent TOKUKAI No. 2003-222928 in which the first blade group-driving member is composed of two driving members and to a focal plane shutter as disclosed as the second embodiment in Japanese Patent TOKUKAI No. 2004-264468 in which a motor is used as a driving source.

In addition, although the space between the shutter base plate 1 and the middle plate 2 is used as the blade room for the second blade group in the present embodiment, there are some focal plane shutters in which the space between the middle plate 2 and the auxiliary base plate 3 are used as the blade room for the second blade group. The present invention is also applicable to such focal plane shutters. In such a case, a focal plane shutter should be formed in such a way that: an auxiliary base plate 3 is formed thicker than that in the present embodiment; the auxiliary base plate 3 is provided with a push pin corresponding to the push pin 1q for the present embodiment; and the push pin makes a middle plate 2 bend toward a shutter base plate 1.

Embodiment 2

Next, the embodiment 2 is explained using FIGS. 4 to 6. FIGS. 4 to 6 show the focal plane shutter of the present embodiment in the same manner as FIGS. 1 to 3 used for explaining the embodiment 1 do, respectively. And, the constitution of the focal plane shutter of the present embodiment is different from that of the focal plane shutter of the embodiment 1 only in the shape of the middle plate. Accordingly, in FIGS. 4 to 6, components and portions except the middle plate in the focal plane shutter of the present embodiment are given the same reference numerals as the components and the portions are given in FIGS. 1 to 3, and the explanations of these components and these portions are omitted. Also, the operation of the focal plane shutter of the present embodiment is substantially the same as that of the embodiment 1. Accordingly, the explanation of the operation of the focal plane shutter of the embodiment 1 is quoted for the explanation of the operation of the focal plane shutter of the present embodiment.

Next, the shape of a middle plate 22 for the present embodiment and the constitution for fitting the middle plate 22 are explained. The middle plate 22 for the present embodiment is provided with three holes which are located in the three corners of the middle plate 22 except the left-upper corner of the middle plate 22 respectively, and the shafts 1m, 1n, and 1p of the shutter base plate 1 are fitted into the three holes of the middle plate 22 respectively in such a way that the middle plate 22 can move along the shafts 1m, 1n, and 1p, as in the middle plate 2 for the embodiment 1. The left-upper corner portion of the middle plate 22 can touch the reception part 1r of the shutter base plate 1 from the auxiliary-base-plate-3 side. Also, the areas of the middle plate 22 on the left, right, and upper sides of the exposure aperture have the same shapes as those of the middle plate 2 for the embodiment 1 do, respectively. Accordingly, a contour shape-forming edge 22b above the exposure aperture is formed in the shape of an arc to become convex toward the exposure aperture, like the contour shape-forming edge 2b in the embodiment 1.

However, the area of the middle plate 22 for the present embodiment which is located below the exposure aperture is formed to have a shape which is different from that of the area of the middle plate 2 of the embodiment 1 which is located below the exposure aperture. That is to say, a contour shape-forming edge 22d of the middle plate 22 below the exposure aperture is formed to be parallel to the long side of the exposure aperture in the present embodiment. Also, a slit 22e is formed to run from the apex of a V-shaped edge 22c of an opening portion 22a to the contour shape-forming edge 22d with the slit 22e perpendicular to the long side of the exposure aperture. As a result, the area of the middle plate 22 below the exposure aperture has a shape in which the portion having the narrowest width in the area of the middle plate 22 below the exposure aperture is divided by the slit 22e. And, the portions of the middle plate 22 forming the both sides of the slit 22e are pushed by the push pin 1q of the shutter base plate 1 toward the auxiliary base plate 3.

As a result, in the present embodiment, although the dimension of the portion having the narrowest width in the area of the middle plate 22 below the exposure aperture (which corresponds to the dimension of the length of the slit 22e) is considerably larger than that of the middle plate 2 for the embodiment 1, the slit 22e is formed in the portion having the narrowest width, so that the portion having the narrowest width in the area of the middle plate 22 below the exposure aperture can be bent by the push pin 1q as easily as or more easily than that of the middle plate 2 for the embodiment 1. Besides, the present invention does not ban providing the middle plate 2 for the embodiment 1 with a slit as in the present embodiment. When the middle plate 2 is provided with such a slit, it is possible to obtain a middle plate capable of bending yet more easily. Also, the explanations of matters which are explained in the embodiment 1 and are clearly pertinent also to the present embodiment are applicable to the present embodiment, the explanations of these matters being not explained in the present embodiment in order to avoid duplication.

Embodiment 3

Next, the embodiment 3 is explained using FIGS. 7 and 8. FIGS. 7 and 8 show the focal plane shutter of the present embodiment in the same manner as FIGS. 1 and 2 used for explaining the embodiment 1 do, respectively. That is to say, FIGS. 7 and 8 show the focal plane shutter of the present embodiment in the same manner as FIGS. 4 and 5 used for explaining the embodiment 2 do, respectively. And, the constitution of the focal plane shutter of the present embodiment is different from that of the focal plane shutter of the embodiment 2 only in shape of the middle plate and constitution of fitting the middle plate. Accordingly, in FIGS. 7 and 8, components and portions except the middle plate in the focal plane shutter of the present embodiment are given the same reference numerals as the components and the portions are given in each of the embodiments 1 and 2, and the explanations of these components and these portions are omitted. Also, the operation of the focal plane shutter of the present embodiment is also substantially the same as that of the embodiment 1. Accordingly, the explanation of the operation of the focal plane shutter of the embodiment 1 is quoted also for the explanation of the operation of the focal plane shutter of the present embodiment.

Next, the shape of a middle plate 32 for the present embodiment and the constitution for fitting the middle plate 32 are explained. First, the reception part 1r is not formed on the base of the shaft 1k of the shutter base plate 1 in the present embodiment, unlike each of the embodiments 1 and 2. Also, an auxiliary base plate 3 for the present embodiment is a plate member which is thicker than the auxiliary base plates for the embodiments 1 and 2. And, the auxiliary base plate 3 for the present embodiment is provided with a push pin 3b which is erectly placed on the middle portion between the contour shape-forming edge and an opening portion 3a in the area of the auxiliary base plate 3 above the exposure aperture, which is equal to the push pin 1q that is erectly provided on the shutter base plate 1, and which runs toward a middle plate 32.

In addition, the middle plate 32 for the present embodiment is divided into two right and left members in fact. That is to say, in the middle plate 32 for the present embodiment, the area of the middle plate 32 below the exposure aperture is divided from the apex of a V-shaped edge 32c of an opening portion 32a to a contour shape-forming edge 32d by a slit 32e and the portions of the middle plate 32 forming the both sides of the slit 32e are pushed by the push pin 1q of the shutter base plate 1 toward the auxiliary base plate 3, like the middle plate 22 for the embodiment 2. And, the area of the middle plate 32 above the exposure aperture is divided from an edge of the opening portion 32a to an arc-shaped contour shape-forming edge 32b by a slit 32f and the portions of the middle plate 32 forming the both sides of the slit 32f are pushed by the push pin 3b of the auxiliary base plate 3 toward the shutter base plate 1. And, the shafts 1k and 1m of the shutter base plate 1 are fitted into circular holes of the left member of the middle plate 32 respectively, and the shafts 1n and 1p of the shutter base plate 1 are fitted into circular holes of the right member of the middle plate 32 respectively.

As a result, also in the present embodiment, there is no situation where the face of the edge of the slit-forming blade 20 of the second blade group inevitably strikes against the face of the edge of the opening portion 32a of the middle plate 32 in exposure operation, as in the embodiment 2. In addition, even though the first blade group and the second blade group are moved at high speed in cocking operation, there is no situation where the face of the slit-forming edge of the slit-forming blade 14 of the first blade group inevitably strikes against the face of the edge of the opening portion 32a of the middle plate 32 when part of the slit-forming blade 14 moves to the area of the middle plate 32 above the exposure aperture.

Up to now, the focal plane shutters in which each of the first blade group and the second blade group includes four blades have been explained in the embodiments 1 to 3. However, the number of blades constituting each blade group in each of focal plane shutters according to the present invention is not particularly limited, and each blade group in each of focal plane shutters according to the present invention may include any number of blades.

What is claimed is:

1. A focal plane shutter for cameras, in which two blade rooms are formed by separating a space between a shutter base plate and an auxiliary base plate by a middle plate, an exposure aperture is formed by at least one of opening portions on these three plates for guiding light from an object, first and second blade groups arranged in the blade rooms respectively include a plurality of elongate blades, and, in exposure operation, the first blade group changes from the unfolded state of the blades of the first blade group to the folded state of the blades of the first blade group to open the exposure aperture and the second blade group changes from the folded state of the blades of the second blade group to the unfolded state of the blades of the second blade group to close the exposure aperture, wherein

- a second plate which forms the blade room for the second blade group in cooperation with the middle plate is provided with a push pin which is planted on the middle area of the second plate between an exposure aperture-forming side toward which the shutter blade groups move in exposure operation and an outer contour-forming edge of the second plate,
- the middle plate is pushed by the push pin to bend toward a third plate of the three plates, and
- the middle plate is formed in such a way that an area of the middle plate external to the exposure aperture-forming side of the second plate has the narrowest width in the portion which is pushed by the push pin and, as two width-defining edges defining the width of the area of the middle plate external to the exposure aperture-forming side of the second plate extend from the narrowest portion to the both ends of the exposure aperture-forming side of the second plate more and more, the width-defining edge on the exposure-aperture side gradually comes near to the both ends of the exposure aperture-forming side of the second plate and the other width-defining edge gradually comes near to the outer contour-forming edge of the second plate.

2. A focal plane shutter for cameras according to claim 1, wherein the narrowest width in the area of the middle plate external to the exposure aperture-forming side of the second plate is approximately as large as the maximum dimension of the cross section of the push pin in a direction perpendicular to the exposure aperture-forming side.

3. A focal plane shutter for cameras according to claim 1, wherein the narrowest portion in the area of the middle plate external to the exposure aperture-forming side of the second plate is divided by a slit which is formed to run in the direction perpendicular to the exposure aperture-forming side of the second plate, and portions of the middle plate which form the both sides of the slit respectively are pushed by the push pin.

4. A focal plane shutter for cameras according to claim 3, wherein the third plate is provided with a second push pin which is erectly placed on the middle area of the third plate between an exposure aperture-forming side opposite to the exposure aperture-forming side of the second plate and an outer contour-forming edge in the third plate and which runs toward the middle plate, the first blade group being arranged in the space between the third plate and the middle plate,

- an area of the middle plate external to the second exposure aperture-forming side of the third plate is divided by a slit which is formed in a direction perpendicular to the second exposure aperture-forming side of the third plate, and
- portions of the middle plate which form the both sides of the slit are pushed by the second push pin to bend toward the second base plate.

5. A focal plane shutter for cameras according to claim 1, wherein an edge of the opening portion of the middle plate toward which the shutter blade groups move in exposure operation is formed to be approximately shaped like the letter "V",

- an outer contour-forming edge of the middle plate toward which the shutter blade groups move in exposure operation is formed to be approximately parallel to the exposure aperture-forming side of the second plate, and,
- in addition, the area of the middle plate external to the exposure aperture-forming side of the second plate is divided by a slit which is formed from the apex of the V-shaped edge in a direction perpendicular to the exposure aperture-forming side of the second plate and portions of the middle plate which form the both sides of the slit respectively are pushed by the push pin.

6. A focal plane shutter for cameras according to claim 1, wherein the third plate is provided with a second push pin which is planted on the middle area of the third plate between an exposure aperture-forming side opposite to the exposure aperture-forming side of the second plate and an outer contour-forming edge in the third plate and which runs toward the middle plate, the first blade group being arranged in the space between the third plate and the middle plate,

- an area of the middle plate external to the second exposure aperture-forming side of the third plate is divided by a slit which is formed in a direction perpendicular to the second exposure aperture-forming side of the third plate, and
- portions of the middle plate which form the both sides of the slit are pushed by the second push pin to bend toward the second base plate.

\* \* \* \* \*